(12) United States Patent
Isobe (10) Patent No.: US 8,678,634 B2
(45) Date of Patent: Mar. 25, 2014

(54) ILLUMINATING DEVICE AND DISPLAY DEVICE

(75) Inventor: Hiroaki Isobe, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 41 days.

(21) Appl. No.: 13/382,987

(22) PCT Filed: Apr. 7, 2010

(86) PCT No.: PCT/JP2010/056320
§ 371 (c)(1),
(2), (4) Date: Jan. 9, 2012

(87) PCT Pub. No.: WO2011/010492
PCT Pub. Date: Jan. 27, 2011

(65) Prior Publication Data
US 2012/0188790 A1 Jul. 26, 2012

(30) Foreign Application Priority Data
Jul. 23, 2009 (JP) ................. 2009-171946

(51) Int. Cl.
*F21V 7/04* (2006.01)
(52) U.S. Cl.
USPC ............... 362/608; 362/633; 349/58; 349/65
(58) Field of Classification Search
USPC .............. 362/219, 249.01, 249.02, 311.01, 362/311.02, 559, 561, 606, 608–613, 615, 362/617, 621, 623, 630, 631–634; 349/58, 349/61, 62, 65
See application file for complete search history.

(56) References Cited

U.S. PATENT DOCUMENTS

| 7,083,317 | B2 | 8/2006 | Higashiyama |
| 7,221,415 | B2 | 5/2007 | Ono et al. |
| 7,657,042 | B2 * | 2/2010 | Miyata .................. 381/152 |
| 7,766,534 | B2 * | 8/2010 | Iwasaki ................. 362/632 |
| 7,924,364 | B2 * | 4/2011 | Park ..................... 349/58 |
| 2002/0064055 | A1 | 5/2002 | Takahashi et al. |

(Continued)

FOREIGN PATENT DOCUMENTS

| JP | 2003-90993 A | 3/2003 |
| JP | 2003-279973 A | 10/2003 |
| JP | 2003-315792 A | 11/2003 |
| JP | 2004-213943 A | 7/2004 |

(Continued)

OTHER PUBLICATIONS

Official Communication issued in International Patent Application No. PCT/JP2010/056320, mailed on May 18, 2010.

*Primary Examiner* — Hargobind S Sawhney
(74) *Attorney, Agent, or Firm* — Keating & Bennett, LLP (57) ABSTRACT

An illuminating device (3) includes a mounting board (14) on which a plurality of light emitting diodes (8) are arranged in a line, a light guide plate (9) including a light incident surface (9a) for receiving light of the light emitting diodes (8), and a frame (12) including a side face (12b) to which the mounting board (14) is attached, and a bottom face (12a) on which the light guide plate (9) is disposed. The frame (12) includes a groove (12e) in which the end portion of the mounting board (14) is placed, and the groove (12e) is formed between the side face (12b) and the bottom face (12a) on the opposite side of the bottom face (12a) from the light guide plate (9). A supporting member (support) (16) for supporting the light guide plate (9) is placed in the groove (12e).

5 Claims, 7 Drawing Sheets

(56) References Cited

U.S. PATENT DOCUMENTS

| | | |
|---|---|---|
| 2006/0243948 A1 | 11/2006 | Ishiwa et al. |
| 2006/0268194 A1* | 11/2006 | Morimoto et al. .............. 349/65 |
| 2007/0211191 A1* | 9/2007 | Cho et al. ........................ 349/58 |
| 2008/0088763 A1 | 4/2008 | Toriyama et al. |
| 2008/0297687 A1* | 12/2008 | Watanabe ....................... 349/58 |

FOREIGN PATENT DOCUMENTS

| | | |
|---|---|---|
| JP | 2005-17964 A | 1/2005 |
| JP | 2006-267936 A | 10/2006 |
| JP | 2008-58860 A | 3/2008 |
| RU | 2234120 C2 | 8/2004 |

* cited by examiner

ILLUMINATING DEVICE AND DISPLAY DEVICE

TECHNICAL FIELD

The present invention relates to an illuminating device, particularly an illuminating device including a plurality of light emitting diodes arranged in a line and a light guide plate for receiving light from the light emitting diodes, and a display device using the illuminating device.

BACKGROUND ART

In recent years, e.g., a liquid crystal display device has been widely used for a liquid crystal television, a monitor, a portable telephone, etc. as a flat panel display having features such as a smaller thickness and a lighter weight compared to a conventional Braun tube. Such a liquid crystal display device includes an illuminating device (backlight) and a liquid crystal panel. The illuminating device emits light and the liquid crystal panel displays a desired image by serving as a shutter with respect to light from a light source provided in the illuminating device.

The above illuminating device has been provided as an edge-light type or a direct type in which a linear light source composed of a cold-cathode fluorescent tube or a hot-cathode fluorescent tube is located on the side or underside of the liquid crystal panel. However, the cold-cathode fluorescent tube etc. contain mercury and are not easily recyclable when they are discarded. Therefore, an illuminating device using a mercury-free light emitting diode (LED) as a light source has been developed and put into practical use.

Specifically, a conventional illuminating device, as described in, e.g., Patent Document 1, includes a light emitting diode and a light guide plate that receives light from the light emitting diode and emits planar illumination light to a liquid crystal panel. In this conventional illuminating device, the light emitting diode is mounted on a mounting board, and the mounting board has a protrusion below the light emitting diode. Moreover, a mounting groove is formed in the bottom face of a frame on which the light guide plate is mounted. The protrusion is fitted into the mounting groove, so that the light from the light emitting diode can efficiently enter the light guide plate.

In order to meet the requirements such as large screen and high brightness for the liquid crystal display device, the illuminating device needs to include a plurality of light emitting diodes as light sources. Therefore, in a conventional illuminating device, as described in, e.g., Patent Document 2, a plurality of light emitting diodes are arranged in a line on a mounting board, and a plurality of wires connected to the light emitting diodes are also provided on the mounting board and located below the light emitting diodes. Moreover, in this conventional illuminating device, a frame has a bottom face on which a light guide plate is mounted and a side face to which the mounting board is attached, and a groove is formed between the bottom face and the side face of the frame. Thus, the end portion of the mounting board in which the wires are provided can be placed in the groove even if the number of light emitting diodes to be mounted is increased.

PRIOR ART DOCUMENTS

Patent Documents

Patent Document 1: JP 2003-279973 A
Patent Document 2: JP 2006-267936 A

DISCLOSURE OF INVENTION

Problem to be Solved by the Invention

However, in the above conventional illuminating device, the groove is formed between the side face to which the mounting board (on which the light emitting diodes are mounted) is attached and the bottom face on which the light guide plate is mounted. Therefore, assembly accuracy (positioning accuracy) of the light emitting diodes and the light guide plate can be reduced. Consequently, in the conventional illuminating device, when the number of light emitting diodes to be mounted is increased, there may be a problem that nonuniform brightness occurs in the illumination light, and the light emission quality is degraded.

Figure 8:
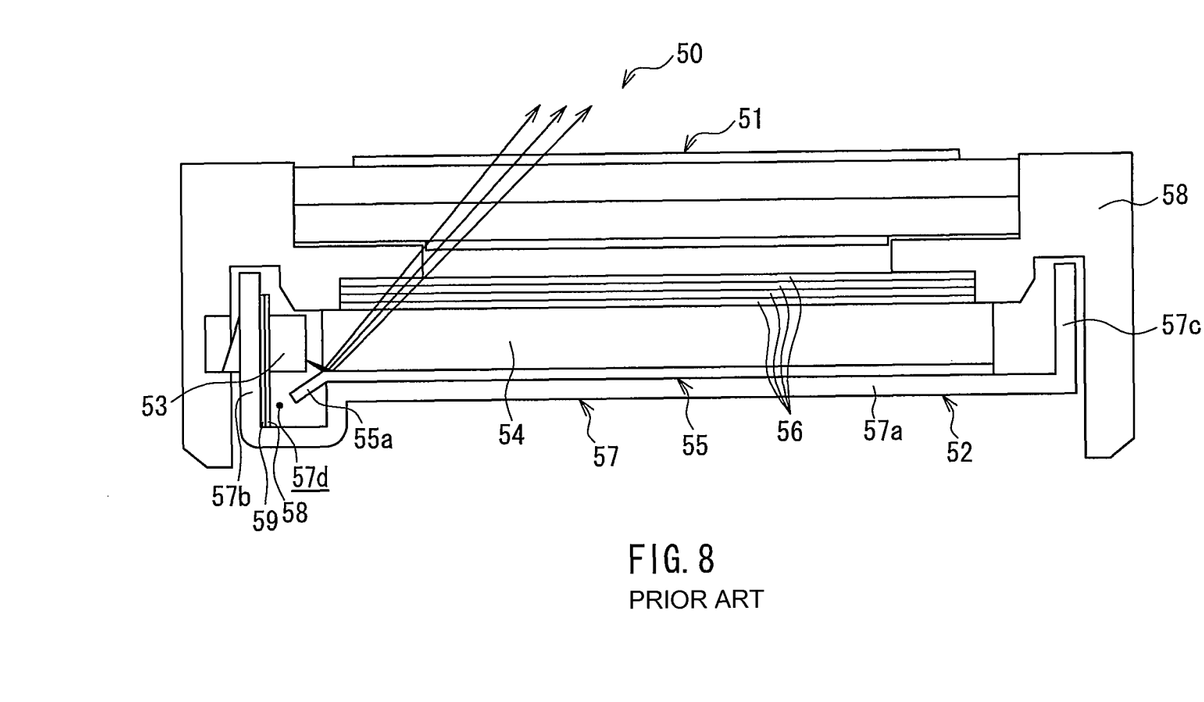
FIG. 8 is a diagram for explaining the problem of a conventional illuminating device.

Referring to FIG. 8, the problem of the conventional illuminating device will be described in detail.

FIG. 8 is a diagram for explaining the problem of the conventional illuminating device.

In FIG. 8, a conventional liquid crystal display device 50 includes a liquid crystal panel 51 and a conventional illuminating device 52 that is located on the non-display surface side of the liquid crystal panel 51 and emits illumination light to the liquid crystal panel 51. The conventional illuminating device 52 includes the following: a plurality of light emitting diodes 53 arranged in a line along the direction perpendicular to the sheet of FIG. 8; a light guide plate 54 that receives light from the light emitting diodes 53 and emits the light toward the liquid crystal panel 51; a reflecting sheet 55 provided on the side of the light guide plate 54 facing away from the liquid crystal panel 51; and an optical sheet 56 provided on the side of the light guide plate 54 facing the liquid crystal panel 51.

The conventional illuminating device 52 also includes a frame 57 that houses every part of the illuminating device 52. In the frame 57, the reflecting sheet 55, the light guide plate 54, and the optical sheet 56 are disposed on a bottom face 57a between opposing side faces 57b and 57c. Moreover, a mounting board 58 on which the light emitting diodes 53 are mounted is attached to the side face 57b via a double-sided tape 59. In the frame 57, a groove 57d is formed between the bottom face 57a and the side face 57b, and the end portion of the mounting board 58 is placed in the groove 57d. The frame 57 is integrally incorporated into a plastic chassis 58 to which the liquid crystal panel 51 is attached.

In the conventional illuminating device 52 having the above configuration, since the groove 57d is formed between the bottom face 57a and the side face 57b, the assembly accuracy of the light emitting diodes 53 and the light guide plate 54 can be reduced. That is, due to the presence of the groove 57d, the distance between the light emitting diodes 53 and the light guide plate 54 in the opposite direction to each other (i.e., the lateral direction of FIG. 8) is increased, which may result in a reduction in the assembly accuracy of the light emitting diodes 53 and the light guide plate 54.

Specifically, in the conventional illuminating device 52, there are some cases where the light emitting diodes 53 and the light guide plate 54 are assembled while the light emitting surfaces of the light emitting diodes 53 (i.e., the surfaces on the right end in FIG. 8) are displaced in the vertical direction of FIG. 8 from a predetermined position relative to the light incident surface of the light guide plate 54 (i.e., the surface on the left end in FIG. 8). When the light emitting diodes 53 and the light guide plate 54 are placed in the frame 57 with such low assembly accuracy, the amount of light unnecessarily reflected by the reflecting sheet 55 is partially increased, as indicated by three arrows in FIG. 8. This causes nonuniform brightness in the illumination light that is emitted toward the liquid crystal panel 51, and thus degrades the light emission quality.

Moreover, as shown in FIG. 8, if the end portion 55a of the reflecting sheet 55 is sagging down on the lower side of FIG. 8 in the groove 57d, light of the light emitting diodes 53 does not properly enter the light guide plate 54, depending on the assembly accuracy of the light emitting diodes 53 and the light guide plate 54. Therefore, the light of the light emitting diodes 53 is likely to be reflected by the end portion 55a in an improper direction, so that nonuniform brightness easily occurs in the illumination light, and the light emission quality is easily degraded as well.

Other then the above description, instead of the reflecting sheet 55, the lower face of the light guide plate or the bottom face of the frame may be used as a reflecting surface. Even in such a case, if the assembly accuracy of the light emitting diodes and the light guide plate is poor, the amount of light unnecessarily reflected by these reflecting surfaces is partially increased. Thus, similarly to the case using the reflecting sheet 55, nonuniform brightness occurs in the illumination light, and the light emission quality is degraded.

With the foregoing in mind, it is an object of the present invention to provide an illuminating device that has excellent light emission quality and can perform the alignment of the light emitting diodes and the light guide plate with high accuracy even if the number of light emitting diodes to be mounted is increased, and a display device using the illuminating device.

Means for Solving Problem

To achieve the above object, an illuminating device of the present invention includes the following: a light emitting diode; a mounting board on which a plurality of the light emitting diodes are arranged in a line; a light guide plate that includes a light incident surface for receiving light of the plurality of the light emitting diodes and a light emitting surface for emitting the light that has entered from the light incident surface, and emits light from the light emitting surface while directing the light that has entered from the light incident surface in a predetermined propagation direction; and a frame that includes a side face to which the mounting board is attached, and a bottom face on which the light guide plate is disposed. The frame includes a groove in which the end portion of the mounting board is placed, and the groove is formed between the side face and the bottom face on the opposite side of the bottom face from the light guide plate. A support for supporting the light guide plate is placed in the groove.

In the illuminating device with the above configuration, the groove is provided, in which the end portion of the mounting board is placed. Therefore, even if the number of light emitting diodes to be mounted on the mounting board is increased, the mounting board can be easily attached to the frame. Moreover, the support for supporting the light guide plate is placed in the groove. Thus, unlike the conventional example, the light emitting diodes and the light guide plate can be aligned with high accuracy even if the number of light emitting diodes to be mounted is increased. Consequently, the illuminating device can prevent the occurrence of nonuniform brightness in the illumination light that is emitted to the outside, and thus can have excellent light emission quality.

In the above illuminating device, it is preferable that the mounting board includes a mounting portion in which the plurality of the light emitting diodes are mounted in a line so as to face the light incident surface of the light guide plate, and a wiring portion that is located on the end portion side of the mounting portion so as to be placed in the groove, and includes a predetermined wiring pattern.

In this case, even if the number of light emitting diodes to be mounted is increased, the light emitting diodes can be reliably arranged with high accuracy as opposed to the light guide plate.

In the above illuminating device, it is preferable that a reflecting sheet is disposed between the light guide plate and the bottom face and reflects the light that has entered from the light incident surface toward the light emitting surface.

In this case, the light utilization efficiency of the light emitting diodes can be reliably improved.

In the above illuminating device, the support may be a supporting member having elasticity.

In this case, since the supporting member has elasticity, the light emitting diodes and the light guide plate can be easily aligned with high accuracy.

In the above illuminating device, the support may be a bending portion formed by bending the end portion of the reflecting sheet in a predetermined shape so as to elastically support the light guide plate.

In this case, since the bending portion of the reflecting sheet elastically supports the light guide plate, the light emitting diodes and the light guide plate can be easily aligned with high accuracy.

In the above illuminating device, it is preferable that the support has thermal conductivity.

In this case, heat dissipation of the light emitting diodes can be improved.

A display device of the present invention includes any one of the above illuminating devices.

The display device with the above configuration uses the illuminating device that has excellent light emission quality and can perform the alignment of the light emitting diodes and the light guide plate with high accuracy even if the number of light emitting diodes to be mounted is increased. Therefore, the display device can easily achieve high brightness and excellent display quality even if the size (i.e., the screen size) is increased.

Effects of the Invention

The present invention can provide an illuminating device that has excellent light emission quality and can perform the alignment of the light emitting diodes and the light guide plate with high accuracy even if the number of light emitting diodes to be mounted is increased, and a display device using the illuminating device.

DESCRIPTION OF THE INVENTION

Hereinafter, preferred embodiments of an illuminating device and a liquid crystal display device using the illuminating device of the present invention will be described with reference to the drawings. In the following description, the present invention is applied to a transmission-type liquid crystal display device. The size and size ratio of each of the constituent members in the drawings do not exactly reflect those of the actual constituent members.

Embodiment 1

Figure 1:
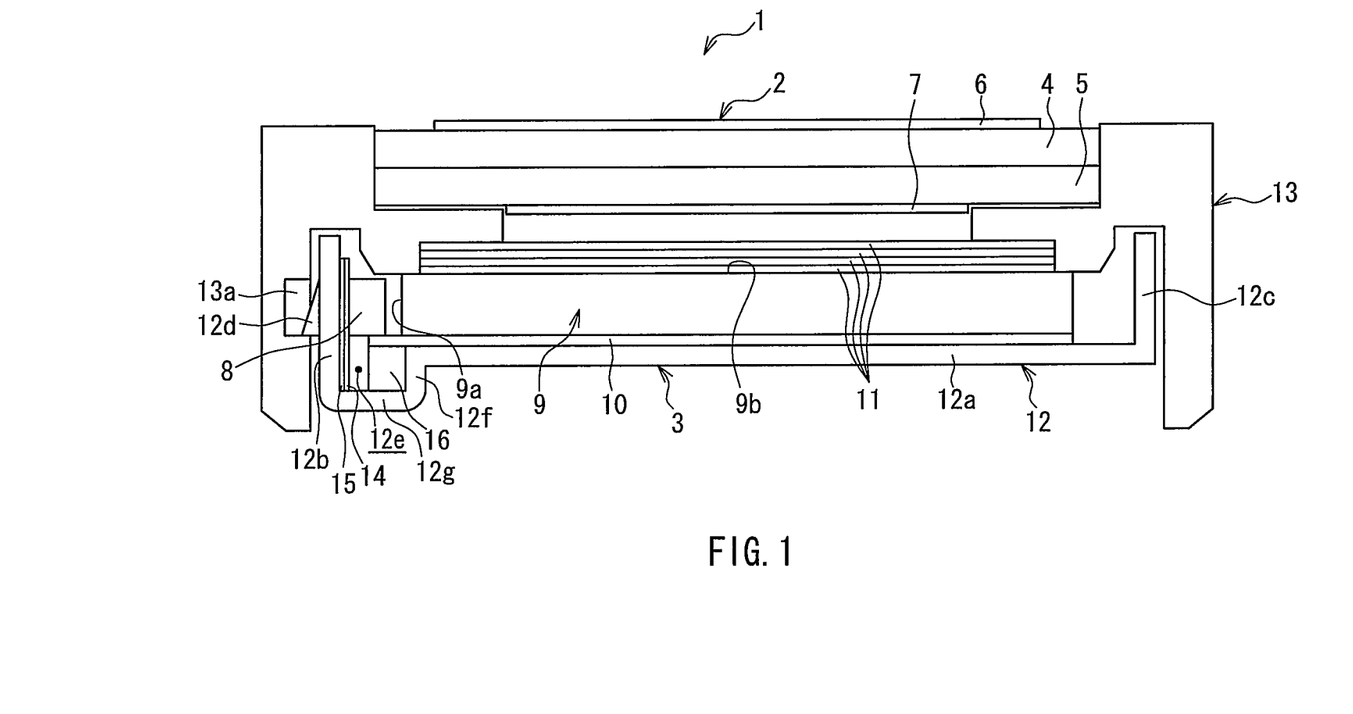
FIG. 1 is a diagram for explaining an illuminating device and a liquid crystal display device according to Embodiment 1 of the present invention.
Figure 2:
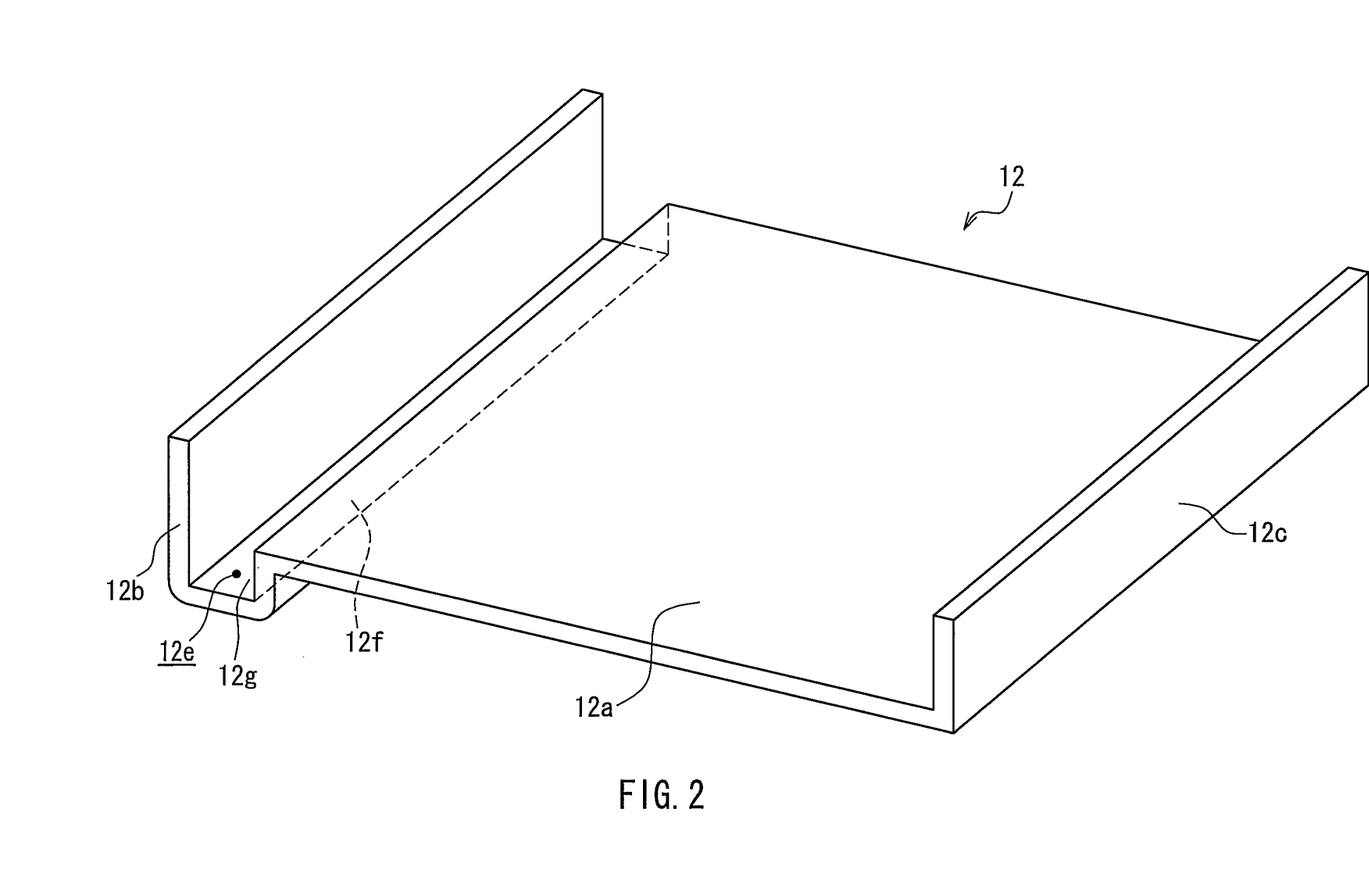
FIG. 2 is a perspective view showing a configuration of the frame shown in FIG. 1.
Figure 3:
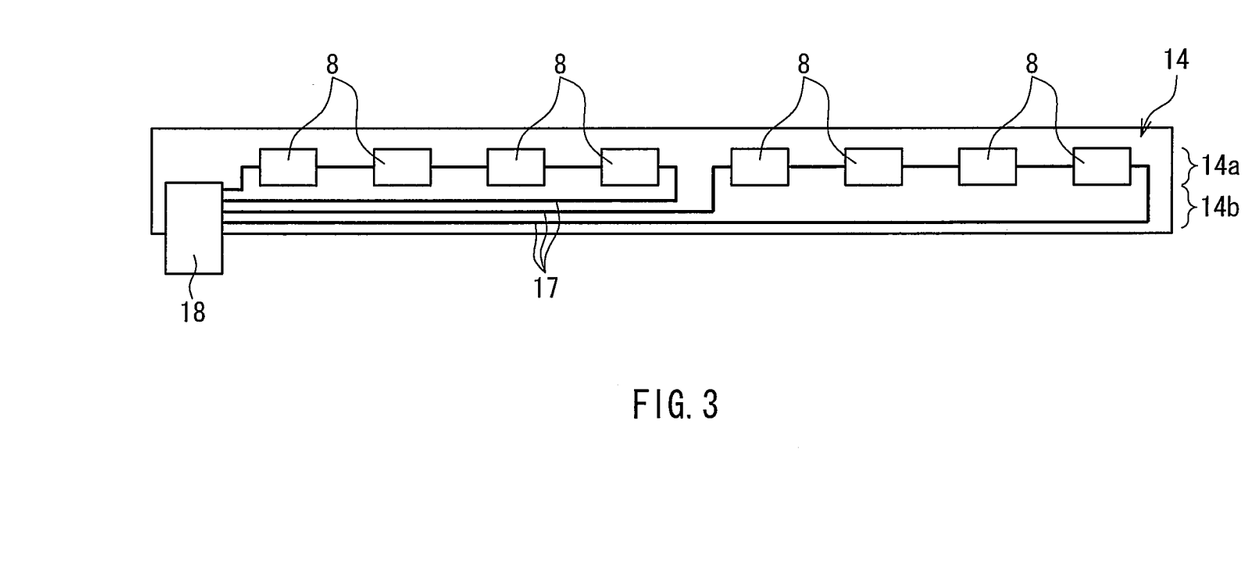
FIG. 3 is a plan view showing a specific configuration of the mounting board shown in FIG. 1.
Figure 4:
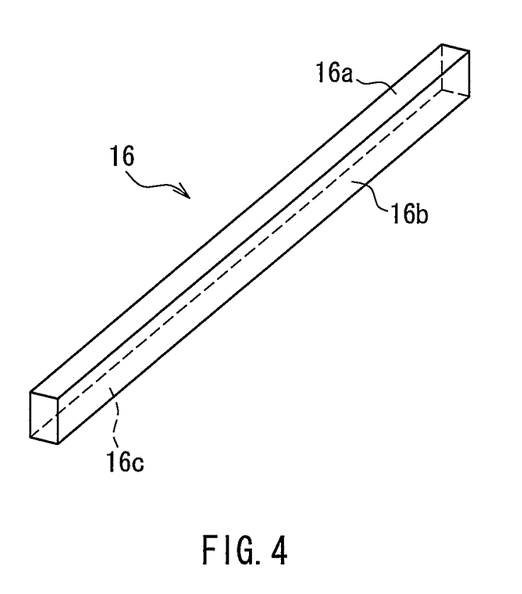
FIG. 4 is a perspective view showing a specific configuration of the supporting member shown in FIG. 1.

FIG. 1 is a diagram for explaining an illuminating device and a liquid crystal display device according to Embodiment 1 of the present invention. FIG. 2 is a perspective view showing a configuration of the frame shown in FIG. 1. FIG. 3 is a plan view showing a specific configuration of the mounting board shown in FIG. 1. FIG. 4 is a perspective view showing a specific configuration of the supporting member shown in FIG. 1.

In FIG. 1, a liquid crystal display device 1 of this embodiment includes a liquid crystal panel 2 that serves as a display portion for displaying information, and an illuminating device 3 that irradiates the liquid crystal panel 2 with illumination light. The liquid crystal panel 2 and the illuminating device 3 are integrated into the transmission-type liquid crystal display device 1.

The liquid crystal panel 2 includes a CF (color filter) substrate 4 and an active matrix substrate 5 that constitute a pair of substrates, and polarizing plates 6, 7 that are provided on the outer surfaces of the CF substrate 4 and the active matrix substrate 5, respectively. A liquid crystal layer (not shown) is interposed between the CF substrate 4 and the active matrix substrate 5. The CF substrate 4 and the active matrix substrate 5 are made of a flat plate-shaped transparent glass material or a transparent synthetic resin such as an acrylic resin. The polarizing plates 6, 7 are made of a resin film such as TAC (triacetyl cellulose) or PVA (polyvinyl alcohol). The polarizing plates 6, 7 are bonded to the corresponding CF substrate 4 or active matrix substrate 5 to cover at least an effective display region of a display surface of the liquid crystal panel 2.

The active matrix substrate 5 constitutes one of the pair of substrates and includes pixel electrodes, TFTs (thin film transistors), etc. that are formed (not shown) between the active matrix substrate 5 and the liquid crystal layer in accordance with a plurality of pixels included in the display surface of the liquid crystal panel 2. Moreover, a control unit (not shown) for performing drive control of the liquid crystal panel 2 is connected to the active matrix substrate 5 and operates the liquid crystal layer pixel by pixel, thereby driving the display surface pixel by pixel. Thus, a desired image can be displayed on the display surface. On the other hand, the CF substrate 4 constitutes the other of the pair of substrates and includes color filters, counter electrodes, etc. that are formed (not shown) between the CF substrate 4 and the liquid crystal layer.

The liquid crystal panel 2 can have any liquid crystal mode and any pixel structure. The liquid crystal panel 2 also can have any drive mode. In other words, any liquid crystal panel capable of displaying information can be used as the liquid crystal panel 2. Therefore, a detailed structure of the liquid crystal panel 2 is not illustrated in FIG. 1, and a description of the detailed structure is omitted.

The illuminating device 3 includes the following: a plurality of light emitting diodes 8 arranged in a line along the direction perpendicular to the sheet of FIG. 1; a light guide plate 9 that receives light from the light emitting diodes 8 and emits the light toward the liquid crystal panel 2; a reflecting sheet 10 provided on the side of the light guide plate 9 facing away from the liquid crystal panel 2; and an optical sheet 11 provided on the side of the light guide plate 9 facing the liquid crystal panel 2. The optical sheet 11 includes predetermined optical sheets such as a lens sheet and a diffusing sheet.

The illuminating device 3 also includes a frame 12 that is made of, e.g., metal and houses every part of the illuminating device 3. In the frame 12, the reflecting sheet 10, the light guide plate 9, and the optical sheet 11 are disposed on a bottom face 12a between opposing side faces 12b and 12c. Moreover, a mounting board 14 on which the light emitting diodes 8 are mounted is attached to the side face 12b, e.g., via a thermally conductive double-sided tape 15. As will be described in detail later, the light emitting diodes 8 are arranged in a line on the mounting board 14, and a predetermined wiring pattern is also formed on the mounting board 14.

The frame 12 is integrally incorporated into a plastic chassis 13 to which the liquid crystal panel 2 is attached. Specifically, the frame 12 has a protrusion 12d on the outside of the side face 12b. As shown in FIG. 1, the protrusion 12d is engaged with a notch 13a that is formed in the plastic chassis 13. Thus, in the liquid crystal display device 1, the frame 12 is integrated with the plastic chassis 13 by the engagement of the protrusion 12d and the notch 13a. When the frame 12 is integrated with the plastic chassis 13 in this manner, the liquid crystal panel 2 and the illuminating device 3 are integrated in a desired assembled state.

In the frame 12, a groove 12e is formed between the bottom face 12a and the side face 12b, and the end portion of the mounting board 14 is placed in the groove 12e. Specifically, referring to FIG. 2 as well as FIG. 1, the frame 12 includes the bottom face 12a in the form of a flat plate, a side face 12c that is formed on one side of the bottom face 12a so as to stand vertically on the bottom face 12a, and the side face 12b that is formed on the other side of the bottom face 12a so as to face the side face 12c. The groove 12e is formed between the side face 12b and the bottom face 12a on the opposite side of the bottom face 12a from the light guide plate 9 (i.e., the lower side of FIG. 1). Thus, the frame 12 also includes a side face 12f and a lower face 12g. The side face 12f extends continuously from the other side of the bottom face 12a in the opposite direction to the side face 12c. The lower face 12g is formed between the side faces 12b and 12f so that one end of the lower face 12g is continuous with the side face 12b and the other end of the lower face 12g is continuous with the side face 12f. In the frame 12, the groove 12e is a space surrounded by the side faces 12b, 12f and the lower face 12g. Moreover, in the groove 12e, the dimensions between the bottom face 12a and the lower face 12g are determined based on the size of the mounting board 14 to allow a wiring portion (as will be described later) provided on the end portion of the mounting board 14 to be placed in the groove 12e.

As shown in FIG. 3, in the mounting board 14, a plurality of, e.g., eight light emitting diodes 8 are arranged in a line and mounted on the surface of the mounting board 14. That is, the mounting board 14 includes a mounting portion 14a and a wiring portion 14b. In the mounting portion 14a, the plurality of light emitting diodes 8 are mounted in a line so as to face a light incident surface 9a (FIG. 1) of the light guide plate 9. The wiring portion 14b is located on the end portion side of the mounting portion 14a so as to be placed in the groove 12e, and includes a predetermined wiring pattern having a plurality of wires 17. In the illuminating device 3 of this embodiment, since the mounting board 14 includes the mounting portion 14a and the wiring portion 14b, even if the number of light emitting diodes 8 to be mounted is increased, the light emitting diodes 8 can be reliably arranged with high accuracy relative to the light guide plate 9.

Each of the light emitting diodes 8 may be, e.g., a 3-in-1 type obtained by combining red (R), green (G), and blue (B) light emitting diodes, or a type using a blue light emitting diode with a yellow phosphor. Moreover, each of the light emitting diodes 8 is a top view type where the light emitting surface is a rectangular plane (see FIG. 3) and is located opposite to the light incident surface 9a of the light guide plate 9. In the illuminating device 3 of this embodiment, as shown in FIG. 3, two groups of light emitting diodes 8 are connected in parallel, each group including four light emitting diodes 8 connected in series by the wire 17. Moreover, wiring (not shown) provided in a flexible circuit board 18 is electrically connected to the wires 17, so that electric power is supplied to the light emitting diodes 8 from a power source (not shown).

Referring back to FIG. 1, the light guide plate 9 includes the light incident surface 9a that is located opposite to the light emitting surfaces of the light emitting diodes 8 and receives light from the light emitting diodes 8, and a light emitting surface 9b that emits the light of the light emitting diodes 8 that has entered from the light incident surface 9a. The light guide plate 9 emits light from the light emitting surface 9b toward the liquid crystal panel 2 while directing the light of the light emitting diodes 8 that has entered from the light incident surface 9a in a predetermined propagation direction (i.e., the right direction of FIG. 1). Because of the reflecting sheet 10 that is disposed between the light guide plate 9 and the bottom face 12a of the frame 12, the light that has entered from the light incident surface 9a is reflected toward the light emitting surface 9b in the light guide plate 9.

As shown in FIG. 1, the light guide plate 9 is disposed on the bottom face 12a of the frame 12 with its end portion protruding toward the groove 12e. Moreover, the end portion of the reflecting sheet 10 extends toward the groove 12e. In the illuminating device 3 of this embodiment, the light guide plate 9 is supported by a supporting member (support) 16 that is placed in the groove 12e.

Specifically, as shown in FIG. 4, the supporting member 16 is a prismatic member having an upper face 16a, a side face 16b, and a lower face 16c. The supporting member 16 is placed in the groove 12e with the side face 16b and the lower face 16c in contact with the side face 12f and the lower face 12g of the frame 12, respectively, and supports the light guide plate 9 by bringing the upper face 16a into contact with the reflecting sheet 10 under the end portion of the light guide plate 9.

The supporting member 16 is made of a material having elasticity such as rubber or a foam material, and elastically supports the light guide plate 9 in the groove 12e. In the illuminating device 3 of this embodiment, when the light guide plate 9 and the reflecting sheet 10 are disposed on the bottom face 12a, the height of the supporting member 16 (i.e., the distance in the vertical direction of FIG. 1) is adjusted, so that the individual light emitting surfaces of the light emitting diodes 8 and the light incident surface 9a of the light guide plate 9 are located opposite to each other in a desired position. Accordingly, the light emitting diodes 8 and the light guide plate 9 can be assembled with high accuracy.

In the illuminating device 3 having the above configuration of this embodiment, the frame 12 includes the groove 12e in which the end portion of the mounting board 14 is placed. Therefore, even if the number of light emitting diodes 8 to be mounted on the mounting board 14 is increased, the mounting board 14 can be easily attached to the frame 12. Moreover, in the illuminating device 3 of this embodiment, the supporting member (support) 16 for supporting the light guide plate 9 is placed in the groove 12e. Thus, unlike the conventional example, the light emitting diodes 8 and the light guide plate 9 can be aligned with high accuracy even if the number of light emitting diodes 8 to be mounted is increased. Consequently, the illuminating device 3 of this embodiment can prevent the occurrence of nonuniform brightness in the illumination light that is emitted to the outside, and thus can have excellent light emission quality.

In the illuminating device 3 of this embodiment, as shown in FIG. 1, the supporting member 16 is in contact with the reflecting sheet 10 that extends toward the groove 12e. Therefore, unlike the conventional example shown in FIG. 8, it is possible to prevent the end portion of the reflecting sheet 10 from sagging down on the lower side of FIG. 1 in the groove 12e. With this configuration, unlike the above conventional example, the illuminating device 3 of this embodiment can prevent the light of the light emitting diodes 8 from being reflected by the end portion of the reflecting sheet 10 in an improper direction, and thus can prevent both the occurrence of nonuniform brightness in the illumination light and the degradation of the light emission quality.

In the illuminating device 3 of this embodiment, since the supporting member 16 is made of a material having elasticity, the light emitting diodes 8 and the light guide plate 9 can be easily aligned with high accuracy. Moreover, even if the reflecting sheet 10 comes into contact with the light emitting diodes 8, the supporting member 16 is elastically deformed so that a physical force due to the contact with the reflecting sheet 10 is applied to the light emitting diodes 8, thereby preventing damage to the light emitting diodes 8.

This embodiment uses the illuminating device 3 that has excellent light emission quality and can perform the alignment of the light emitting diodes 8 and the light guide plate 9 with high accuracy even if the number of light emitting diodes 8 to be mounted is increased. Therefore, this embodiment can easily provide the liquid crystal display device (display device) 1 with high brightness and excellent display quality even if the size (i.e., the screen size) is increased.

Other than the above description, the end portion of the reflecting sheet 10 may be shortened, e.g., by imparting light reflecting properties to the upper face 16a of the supporting member 16, and this upper face 16a may be directly brought into contact with the end portion of the light guide plate 9, thereby supporting the light guide plate 9 with the supporting member 16.

Embodiment 2

Figure 5:
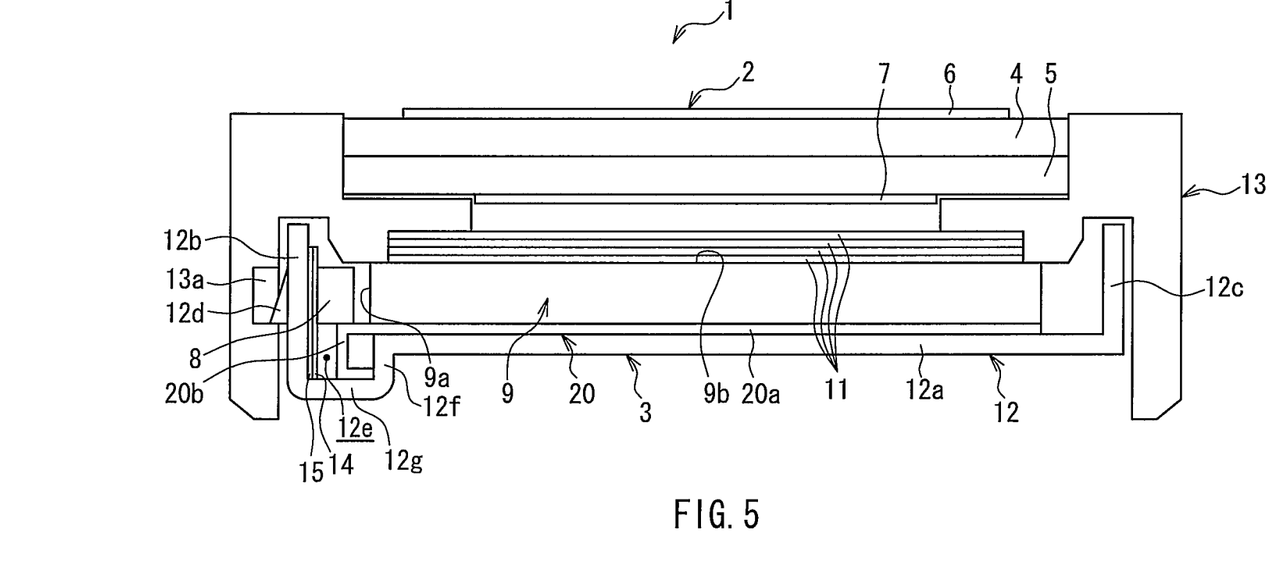
FIG. 5 is a diagram for explaining an illuminating device and a liquid crystal display device according to Embodiment 2 of the present invention.
Figure 6:
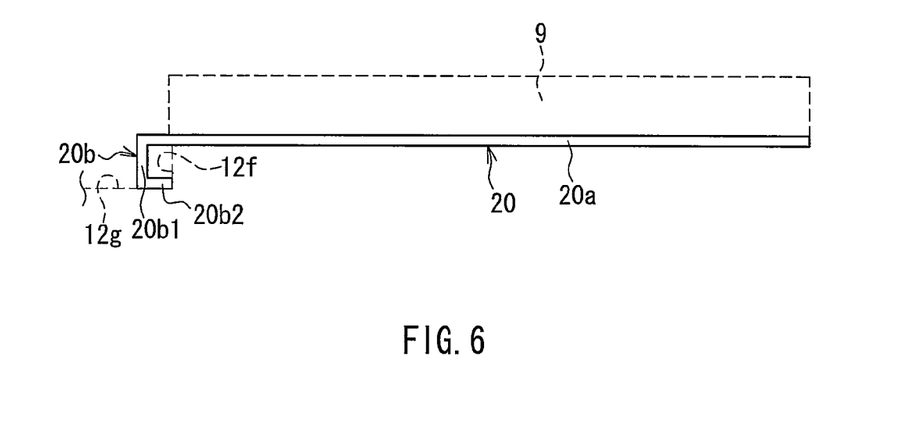
FIG. 6 is a side view showing a specific configuration of the reflecting sheet shown in FIG. 5.

FIG. 5 is a diagram for explaining an illuminating device and a liquid crystal display device according to Embodiment 2 of the present invention. FIG. 6 is a side view showing a specific configuration of the reflecting sheet shown in FIG. 5. In FIGS. 5 and 6, this embodiment mainly differs from Embodiment 1 in that a bending portion formed by bending the end portion of the reflecting sheet in a predetermined shape is used instead of the supporting member to elastically support the light guide plate. The same components as those in Embodiment 1 are denoted by the same reference numerals, and the explanation will not repeated.

As shown in FIGS. 5 and 6, in the illuminating device 3 of this embodiment, a reflecting sheet 20 includes a main body portion 20a and a bending portion 20b. The main body portion 20a is in contact with the bottom face (i.e., the opposite surface of the light emitting surface 9b) of the light guide plate 9 and reflects light to the inside of the light guide plate 9. The bending portion 20b is formed by bending the end portion on the groove 12e side in a U shape in cross section. The bending portion 20b is placed in the groove 12e and constitutes a support for supporting the light guide plate 9.

The reflecting sheet 20 is made of a synthetic resin having elasticity such as a PET (polyethylene terephthalate) resin. In the reflecting sheet 20, the bending portion 20b comes into contact with the end portion of the light guide plate 9 that protrudes toward the groove 12e, and thus elastically supports the light guide plate 9. As shown in FIG. 6, the bending portion 20b has a portion 20b1 that is bent at an angle of 90° with respect to the main body portion 20a, and a portion 20b2 that is bent at an angle of 90° with respect to the portion 20b1. The bending portion 20b supports the light guide plate 9 with the portion 20b2 in contact with the lower face 12g of the frame 12.

With the above configuration, this embodiment can have the same function and effect as those of Embodiment 1. In this embodiment, since the bending portion 20b of the reflecting sheet 20 elastically supports the light guide plate 9, the light emitting diodes 8 and the light guide plate 9 can be easily aligned with high accuracy. Moreover, even if the reflecting sheet 20 comes into contact with the light emitting diodes 8, the bending portion 20b is elastically deformed so that a physical force due to the contact with the reflecting sheet 20 is applied to the light emitting diodes 8, thereby preventing damage to the light emitting diodes 8.

Figure 7A:
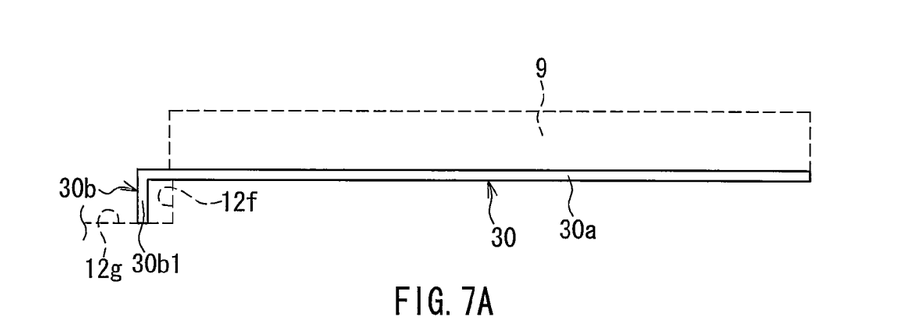
FIGS. 7A and 7B are side views showing specific configurations of modified examples of the reflecting sheet shown in FIG. 5, respectively.
Figure 7B:
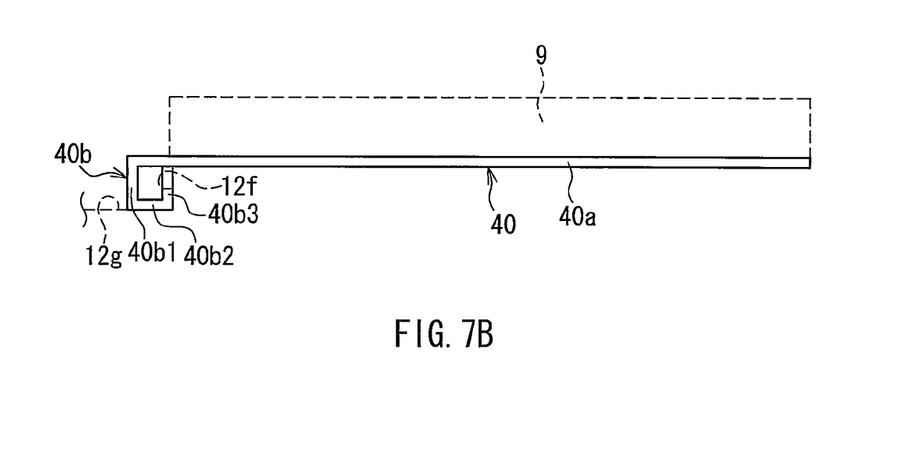

Other than the above description, a reflecting sheet 30 shown in FIG. 7A or a reflecting sheet 40 shown in FIG. 7B can be used.

As shown in FIG. 7A, the reflecting sheet 30 includes a main body portion 30a and a bending portion 30b. The main body portion 30a is in contact with the bottom face (i.e., the opposite surface of the light emitting surface 9b) of the light guide plate 9 and reflects light to the inside of the light guide plate 9. The bending portion 30b is formed by bending the end portion on the groove 12e side in an L shape in cross section. The bending portion 30b is placed in the groove 12e and constitutes a support for supporting the light guide plate 9.

Like the reflecting sheet 20, the reflecting sheet 30 is made of a synthetic resin having elasticity such as a PET (polyethylene terephthalate) resin. In the reflecting sheet 30, the bending portion 30b comes into contact with the end portion of the light guide plate 9 that protrudes toward the groove 12e, and thus elastically supports the light guide plate 9. As shown in FIG. 7A, the bending portion 30b has a portion 30b1 that is bent at an angle of 90° with respect to the main body portion 30a. The bending portion 30b supports the light guide plate 9 with the edge of the portion 30b1 in contact with the lower surface 12g of the frame 12.

As shown in FIG. 7B, the reflecting sheet 40 has a main body portion 40a and a bending portion 40b. The main body portion 40a is in contact with the bottom face (i.e., the opposite surface of the light emitting surface 9b) of the light guide plate 9 and reflects light to the inside of the light guide plate 9. The bending portion 40b is formed by bending the end portion on the groove 12e side in a picture frame shape in cross section. The bending portion 40b is placed in the groove 12e and constitutes a support for supporting the light guide plate 9.

Like the reflecting sheet 20, the reflecting sheet 40 is made of a synthetic resin having elasticity such as a PET (polyethylene terephthalate) resin. In the reflecting sheet 40, the bending portion 40b comes into contact with the end portion of the light guide plate 9 that protrudes toward the groove 12e, and thus elastically supports the light guide plate 9. As shown in FIG. 7B, the bending portion 40b has a portion 40b1 that is bent at an angle of 90° with respect to the main body portion 40a, a portion 40b2 that is bent at an angle of 90° with respect to the portion 40b1, and a portion 40b3 that is bent at an angle of 90° with respect to the portion 40b2. The bending portion 40b supports the light guide plate 9 with the portion 40b2 and the portion 40b3 in contact with the lower face 12g and the side face 12f of the frame 12, respectively.

It should be noted that the above embodiments are all illustrative and not restrictive. The technological scope of the present invention is defined by the appended claims, and all changes that come within the range of equivalency of the claims are intended to be embraced therein.

In the above description, the present invention is applied to the transmission type liquid crystal display device. However, the illuminating device of the present invention is not limited thereto, and may be applied to various display devices including a non-luminous display portion that utilizes light from the light emitting diodes to display information such as images and characters. Specifically, the illuminating device of the present invention can be suitably used in a semi-transmission type liquid crystal display device or a projection type display device using a liquid crystal panel as a light valve.

In the above description, the frame has two opposing side faces, and the groove is formed between one of the side faces and the bottom face, while the mounting board on which the light emitting diodes are mounted is attached to this side face. However, the present invention may use any frame as long as it includes a groove in which the end portion of the mounting board is placed, and the groove is formed between the side face and the bottom face on the opposite side of the bottom face from the light guide plate. For example, a groove may be formed between each of two side faces and the bottom face, and a mounting board may be attached to each of the side faces, so that two opposing side faces of the light guide plate can be light incident surfaces. Moreover, the frame may have four side faces surrounding the bottom face, and a mounting board may be attached to each of the four side faces.

In the above description, the total of eight light emitting diodes are arranged in a line on the mounting board, in which two groups of light emitting diodes are connected in parallel, each group including four light emitting diodes connected in series. However, the present invention may use any mounting board as long as the light emitting diodes are arranged in a line, and the number of light emitting diodes to be mounted and the connection method of the light emitting diodes are not limited to those described above.

In the above description, the reflecting sheet is used. However, the illuminating device of the present invention is not particularly limited as long as the support placed in the groove supports the light guide plate. For example, instead of the reflecting sheet, the lower face of the light guide plate or the bottom face of the frame may be used as a reflecting surface.

As described in each of the above embodiments, the use of the reflecting sheet is preferred because the light utilization efficiency of the light emitting diodes can be reliably improved.

In the above description, the supporting member (support) or the reflecting sheet is made of a thermally conductive material. However, the support of the present invention is not particularly limited as long as it is placed in the groove to support the light guide plate.

As described in each of the above embodiments, the use of a thermally conductive material for the support is preferred because heat dissipation of the light emitting diodes can be improved, and also the light emitting diodes can have a longer life by easily reducing the ambient temperature of the light emitting diodes.

In the above description, the 3-in-1 type obtained by combining RGB light emitting diodes is used. However, the type of light emitting diode is not particularly limited as long as a plurality of colors of light emitting diodes emit a plurality of colors of light that can be mixed into white light. Specifically, the present invention may use a so-called four-in-one (4 in 1) type obtained by combining RGBW light emitting diodes, two types of light emitting diodes that emit yellow light and blue light, or a light emitting diode using a blue light emitting diode with a yellow phosphor. Alternatively, the present invention may use three light emitting diodes individually composed of RGB light emitting diodes.

Other than the above description, Embodiments 1 and 2 may be combined as needed.

INDUSTRIAL APPLICABILITY

The present invention is useful for an illuminating device that has excellent light emission quality and can perform the alignment of the light emitting diodes and the light guide plate with high accuracy even if the number of light emitting diodes to be mounted is increased, and a display device using the illuminating device.

DESCRIPTION OF REFERENCE NUMERALS

1 Liquid crystal display device
2 Liquid crystal panel
3 Illuminating device
8 Light emitting diode
9 Light guide plate
9a Light incident surface
9b Light emitting surface
10, 20, 30, 40 Reflecting sheet
20b, 30b, 40b Bending portion (support)
12 Frame
12a Bottom face
12b Side face
12e Groove
14 Mounting board
14a Mounting portion
14b Wiring portion
16 Supporting member (support)

The invention claimed is:

1. An illuminating device comprising:
a light emitting diode;
a mounting board on which a plurality of the light emitting diodes are arranged in a line;
a light guide plate that includes a light incident surface arranged to receive light of the plurality of the light emitting diodes and a light emitting surface arranged to emit the light that has entered from the light incident surface, and emits light from the light emitting surface while directing the light that has entered from the light incident surface in a predetermined propagation direction; and
a frame that includes a side face to which the mounting board is attached, and a bottom face on which the light guide plate is disposed, wherein
the frame includes a groove in which an end portion of the mounting board is placed, and the groove is formed between the side face and the bottom face on an opposite side of the bottom face from the light guide plate,
a support that supports the light guide plate is located in the groove,
a reflecting sheet is disposed between the light guide plate and the bottom face of the frame and reflects the light that has entered from the light incident surface toward the light emitting surface, and
the support is a bending portion formed by bending an end portion of the reflecting sheet in a predetermined shape so as to elastically support the light guide plate.

2. The illuminating device according to claim 1, wherein the mounting board includes a mounting portion in which the plurality of the light emitting diodes are mounted in a line so as to face the light incident surface of the light guide plate, and a wiring portion that is located on the end portion side of the mounting portion so as to be placed in the groove, and includes a predetermined wiring pattern.

3. The illuminating device according to claim 1, wherein the support is a supporting member having elasticity.

4. The illuminating device according to claim 1, wherein the support has thermal conductivity.

5. A display device comprising the illuminating device according to claim 1.

* * * * *